K. WESSEL.
MACHINE FOR MAKING ICE CREAM CONES.
APPLICATION FILED JUNE 26, 1911.

1,240,909.

Patented Sept. 25, 1917.
7 SHEETS—SHEET 1.

Fig. 1

K. WESSEL.
MACHINE FOR MAKING ICE CREAM CONES.
APPLICATION FILED JUNE 26, 1911.

1,240,909.

Patented Sept. 25, 1917.
7 SHEETS—SHEET 7.

Witnesses.
A. H. Opsahl.
H. A. Hillgren

Inventor
Karl Wessel.
By his Attorneys
William Merchant

UNITED STATES PATENT OFFICE.

KARL WESSEL, OF ST. PAUL, MINNESOTA.

MACHINE FOR MAKING ICE-CREAM CONES.

1,240,909.  Specification of Letters Patent.  Patented Sept. 25, 1917.

Application filed June 26, 1911. Serial No. 635,257.

*To all whom it may concern:*

Be it known that I, KARL WESSEL, a citizen of the United States, residing at St. Paul, in the county of Ramsey and State of Minnesota, have invented certain new and useful Improvements in Machines for Making Ice-Cream Cones; and I do hereby declare the following to be a full, clear, and exact description of the invention, such as will enable others skilled in the art to which it appertains to make and use the same.

My present invention relates to pastry machines, and is especially directed to the improvement of machines for making ice cream cones.

Generally stated, the invention consists of the novel devices and combinations of devices hereinafter described and defined in the claims.

More particularly, the present machine is designed as an improvement on or modification of that machine disclosed and claimed broadly in my prior co-pending application, S. N. 446,651, filed of date, August 3rd, 1908, and entitled "Machine for making ice cream cones."

In this machine, as in the machine in my prior application, I employ a series of mold sections that are movable on an endless orbit or circuit, and a coöperating loose series of mold sections arranged to be set in coöperative relation in respect to the first series and to be separated therefrom. A baking device or means is provided for action on the mold sections while they are moved in coöperative relation in respect to each other. Preferably, automatic means is employed for separating the mold sections and bringing the same together with a properly timed action, and dough supplying means is also provided for ejecting dough into the receiving molds while the coöperating molds or plungers are removed therefrom.

The machine is preferably constructed as illustrated in the accompanying drawings, wherein like characters indicate like parts throughout the several views. Referring to the drawings.

The framework of the machine is made up of laterally spaced bearing plates 1 and pedestals 2, the latter being rigidly secured on the former, the said laterally spaced parts being connected by suitable ties. A transverse driving shaft 3 is journaled on the frame plates 1, and, at one end, is provided with a large spur gear 4, that meshes with a spur pinion 5, carried by the hub of a driving sheave 6. This driving sheave 6, and an idle driving sheave 7, are loosely journaled, side by side, on a large stud 7ª that projects from one of the frame plates 1. Journaled in the frame plates 1 both in front and at the rear of the driving shaft 3 are heavy sprocket shafts 8, each of which carries a pair of heavy sprocket wheels 9, preferably of the peculiar form best shown in Fig. 5.

The molds of the present machine are designed to form ice cream cones, and hence, are made up of recessed conical receiving molds 10, and conical cores or plungers 11. The members 10 are the dough receiving members, and these are carried by mold bars 12, while the cores 11 are carried by the mold bars 13. Preferably, the bars 12 are pivotally connected or hinged at 14, to form a sort of endless chain, and they are arranged to run in the manner of a sprocket chain over the sprockets 9, of the sprocket shafts 8.
These mold bars 12 are arranged to travel on an endless orbit. The mold bars 13 are independently removable from the coöperating mold bars 12, and they are arranged to travel on a different but intersecting orbit, by means of an automatic so-called transferring device. However, so far as the broad idea of this invention is concerned, the said cone bars 13 might be removed and applied by hand operations. Otherwise stated, the mold bars 13 are dismountable from the machine, either by hand or by automatic mechanism, but preferably the latter.

For imparting a step by step movement to the traveling endless series of mold bars 12, one of the shafts 8 is provided at one end with a ratchet wheel 15, which is engaged by a long driving dog 16, pivotally attached to a short crank arm 17, carried by the adjacent end of the driving shaft 3. The crank 17 is of such length and the teeth of the ratchet wheel 15 are in such numbers, that for each operative stroke of the dog 16, the series of mold bars 12 will be moved just the distance represented by the width of one of the said bars. To accurately set the dog 16 for the above described action, it is shown as made in two sections connected by a turn buckle or threaded sleeve 16ª.

The core plungers 11, for an important reason, instead of being rigidly and immovably secured to the respective bars 13, are mounted therein so that they are capable of slight rotary and endwise movements in respect thereto, the purpose of such movement being to loosen the plungers from the baked cones while the latter are still within the molds 10 of the bars 12.

As shown, the mold bars 12 are provided each with two rows of receiving molds 10, and the mold bars 13 are provided each with two rows of cores 11. Small cap plates 18 (see particularly Figs. 6 and 7) are rigidly secured by screws, or otherwise, to the upper ends of the cores 11, and these are provided with diverging seats 18ª that extend diametrically of the said cores and taper from one side to the other thereof. The contracted ends of the seats 18ª are directed toward the centers of the bars, and toward an interposed connecting bar 19 which has transversely projecting pins 20 that project through the alined and corresponding seats 18ª of said core caps 18. The play between the pins 20 and seats 18ª is in a plane parallel to the plane of the respective mold bars 13. Hence, as is evident, when the bar 19 is moved endwise, all of the cores 11 of that particular mold bar will be simultaneously given a slight rotation sufficient to break the adhesions between the cores and the baked cones. Each connecting bar 19 is supported by and pivotally connected at 21 to small bell cranks 22 which, in turn, are pivoted to the coöperating mold bar 13 at 23. The outwardly extended arms of the bell cranks 22 are pivotally connected to an operating rod 25. This operating rod 25 is mounted for endwise movements in bearings 26 on the mold bar 13, and is provided at one end, with a head 27. A spring 28 compressed between the head 27 and the adjacent bearing 26 tends to hold the connecting bar 19 pressed downward or toward the mold bar 13, and toward the left in respect to Figs. 6 and 7, and in such position of the said parts, the mold cores 11 will be extended for proper coöperation with receiving molds 10 in which they are adapted to then be inserted.

Figure 3:
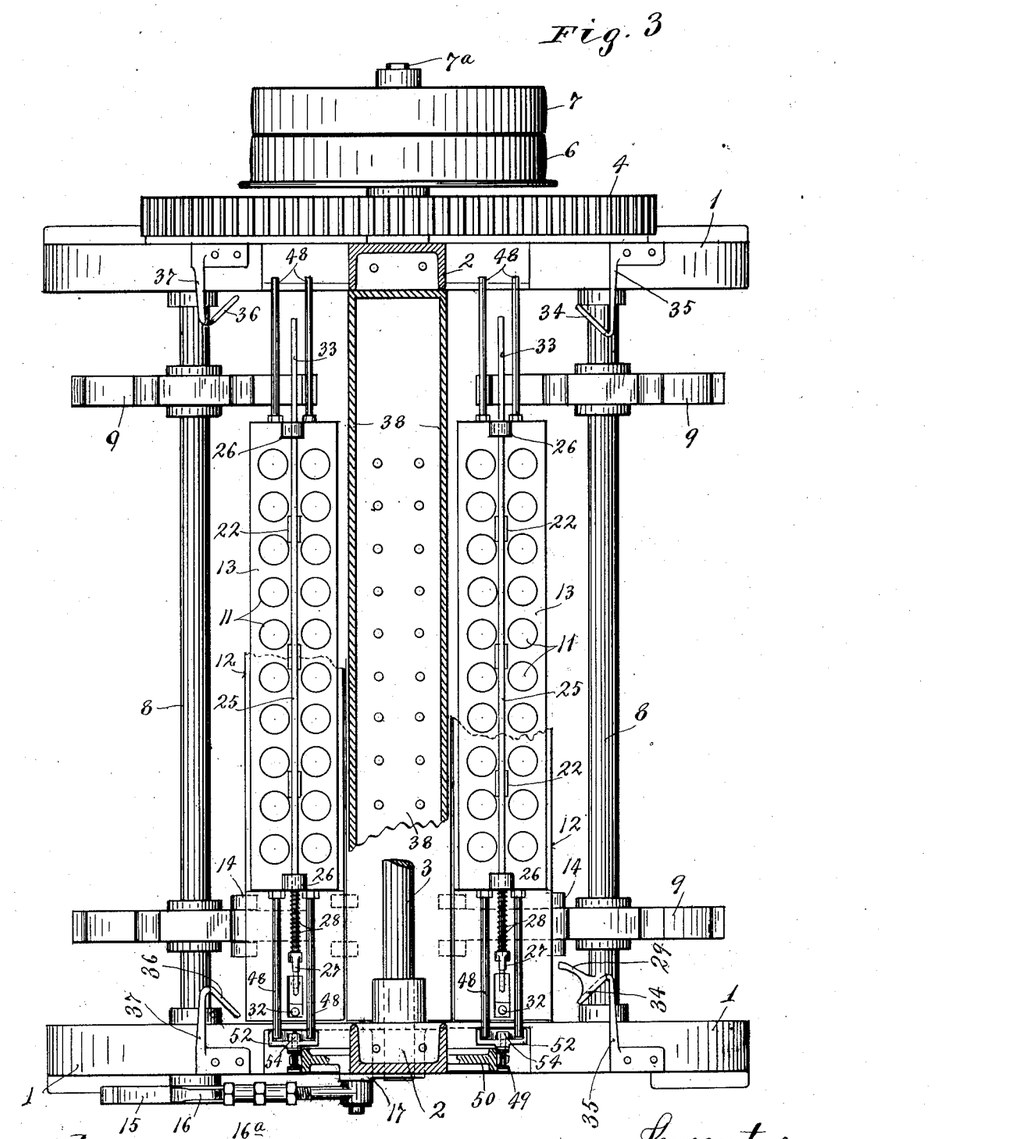
Fig. 3 is a horizontal section taken approximately on the line $x^3$ $x^3$ of Fig. 2, some parts being broken away.
Figure 4:
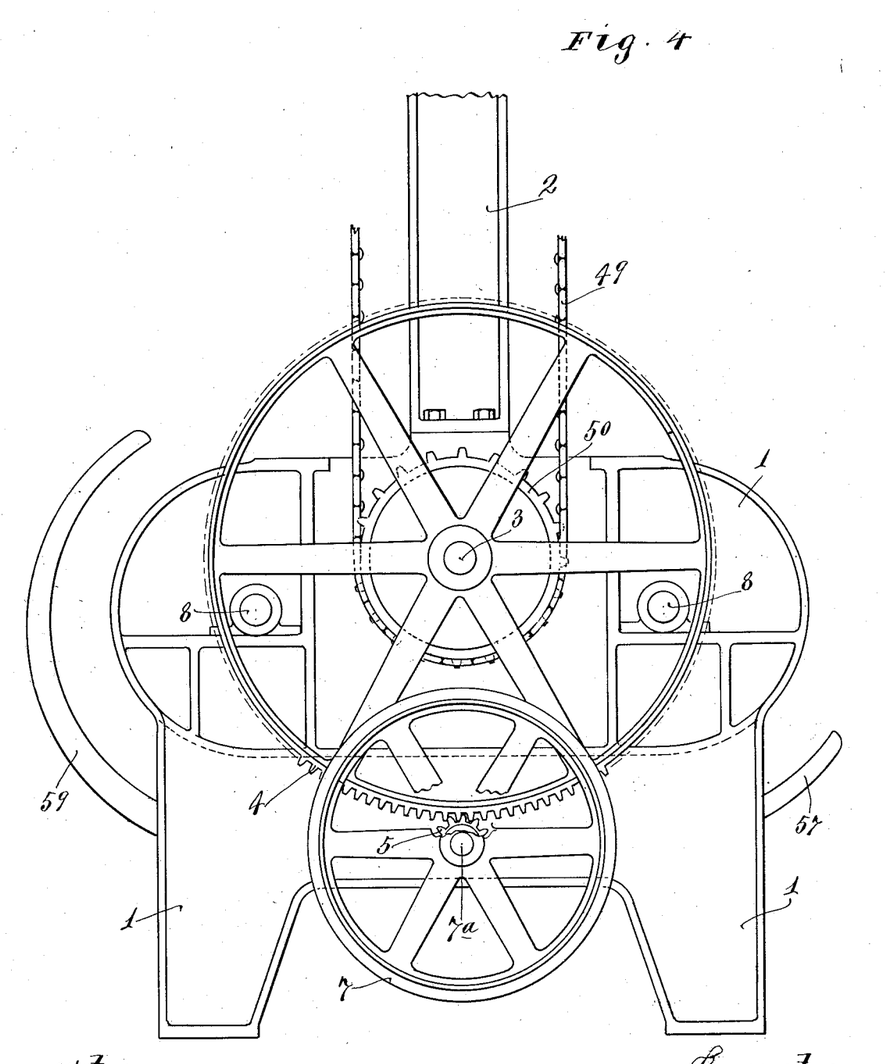
Fig. 4 is a view in right side elevation with some parts broken away showing the framework and traveling connections of the machine.
Figure 6:
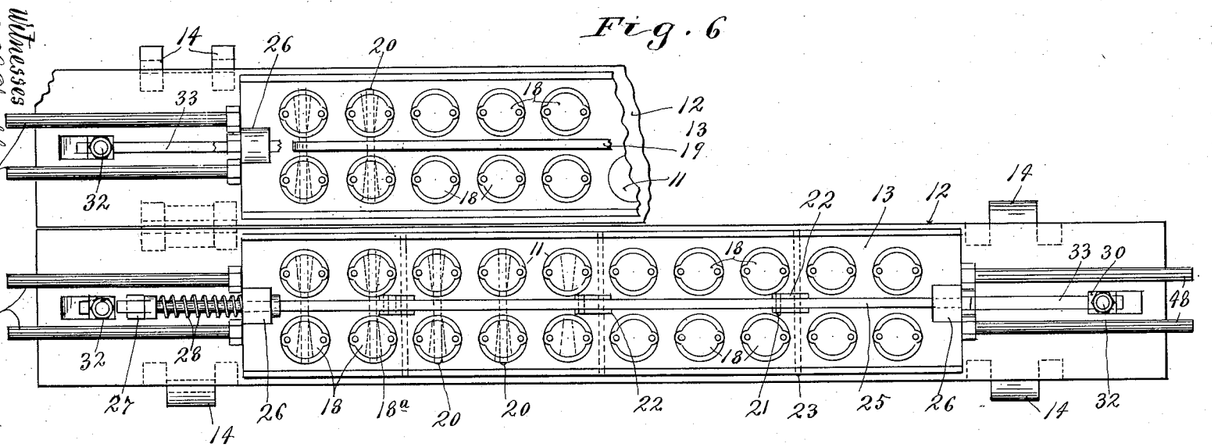
Fig. 6 is a plan view with some parts broken away showing several of the two classes of mold-equipped bars removed from the machine.
Figure 7:
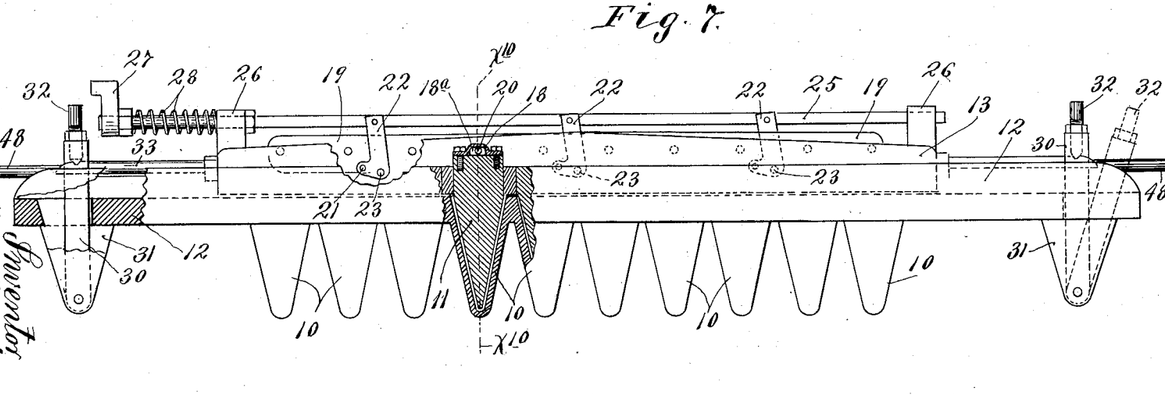
Fig. 7 is a side elevation of the parts shown in Fig. 6, some parts being broken away and with some parts sectioned.
Figure 8:
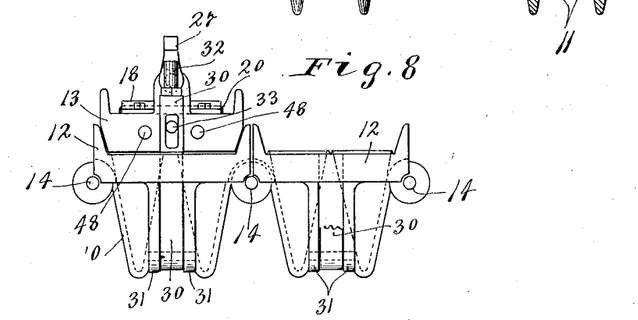
Fig. 8 is an end elevation of the parts shown in Figs. 6 and 7.
Figures 9, 11:
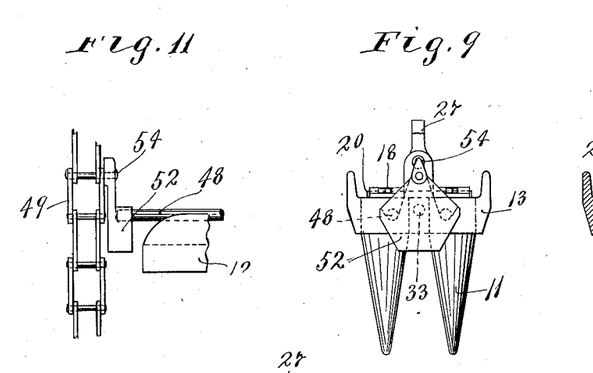
Fig. 9 is an end elevation of one of the series of independently movable mold-equipped bars.
Fig. 11 is a fragmentary detail showing a portion of one of the so-called transferring chains and portions of one of the independently removable bars.
Figure 10:
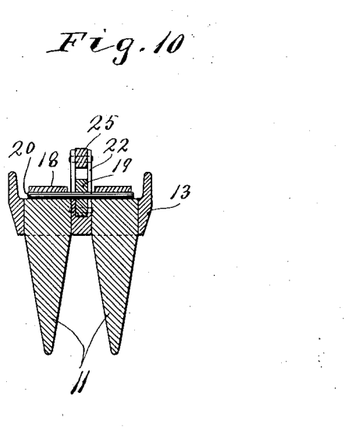
Fig. 10 is a transverse section taken on the line $x^{10}$ $x^{10}$ of Fig. 7.

When the operating rod 25 is pressed toward the right in respect to Figs. 6 and 7, the first effect thereof is to impart the above noted slight rotation to the mold cores, and the second effect thereof, is to raise the connecting bar 19, and to slightly move the cores 11 endwise, outward from the molds 10, thereby completely releasing the cores from the baked cones. Otherwise stated, the so-called cores are loosened from the baked cones by a spiral receding movement. At the proper time, the head 27 of the operating rod 25 will, under advance movement of the endless series of mold bars 12, be engaged and pressed toward the right, as above stated, by engagement with a cam flange or plate 29, secured in respect to the machine frame, (see Fig. 3).

In this preferred arrangement of the two series of mold-equipped bars, the said bars are arranged to be held in coöperative relation in respect to each other, while traveling together a certain distance, by means of suitable clamps applied thereto. The said bar clamping means is preferably, substantially as shown in the drawings, and best illustrated in Figs. 6 and 7, by reference to which, it will be noted that clamping yokes 30 are pivoted at their lower ends to depending lugs 31 on the ends of the mold bars 13. At their upper free ends, the yokes 30 are provided with projecting stems 32, the inner ends of which are beveled and are adapted to cam themselves into engagement with shallow notches formed in the ends of bars 33, that are secured to and project from the ends of the mold bars 13. When the clamping devices 30—32 are engaged with the bar extensions 33, as shown by full lines in Fig. 7, the coöperating bars 12 and 13 will be locked together, with the mold members 10 and 11 in coöperative relation. When, however, the said clamping devices are moved outward, as indicated by dotted lines at the left in Fig. 7, the said bars 12 and 13 are unlocked and the latter may be removed from the former. Means is provided for automatically engaging the bar locking devices with the bar extensions 33 and for disengaging the same at the proper times. Under movement of the upper bars 12 from the right toward the left in respect to Figs. 1 and 3, the stems 32 of the lock devices are engaged with obliquely fixed cam plates 34 shown as secured to, and depending from brackets 35 which, in turn, are rigidly secured to the frame plates 1. Attention is here called to the fact that, as shown, a cam 29, which operates on the head 27, is shown as formed integral with one of the cam plates 34. Reversely set oblique cam plates 36 operate on the stems 32 of the lock device farther toward the left. As shown, these cams 36 are rigidly secured to and depending from brackets 37 secured to the side frames 1. Further action of these cam plates 34 and 36 will be given in the description of the operation.

Located between the front cam plates 34 and rear cam plates 36 and above the mold bar 12, which is positioned midway between these cam plates, is a dough supplying hopper, or receptacle 38 that extends between, and is rigidly secured to the frame pedestals 2. The bottom of this hopper 38 is provided with perforations located one over each of the receiving molds 10, of the intermediately lying bar 12, and each such discharge opening is normally closed by the conical lower end of a plunger valve 39. The upper portions of the plunger valves 39 work through guiding hubs of a guide bar 40 rigidly secured to the top of the hopper 38, and, to the extreme upper ends, are rigidly secured to a cross head 41. The ends of the cross head 41 are connected to the lower ends of the eccentric rods 42 provided at their upper ends with longitudinally slotted heads 43. These slotted heads 43 move vertically on, and are guided by a shaft 44 journaled in suitable bearings 45 on the upper ends of the frame pedestals 2. At their extreme upper ends, the heads 43 are provided with laterally projecting lugs 46 that are supported or cams 47 secured to the shaft 44 and located one on each side of each of said heads 43.

The independently removable mold bars 13, in addition to the projecting lock bars 33, are provided at their ends with long laterally spaced lifting rods 48 that are rigidly secured thereto. These lifting rods 48 will adapt the mold bars 13 to be lifted from the coöperating mold bars 12 and replaced by hand, but this preferred arrangement of the machine is accomplished automatically by an automatic mechanism provided for that purpose and herein designated as a transferring device. This transferring device, as shown, comprises a pair of parallel laterally spaced endless sprocket chains 49 that run over lower sprockets 50 and over upper sprockets 51. The lower sprockets 50 are carried by the driving shaft 3 and the upper sprockets 51 by the shaft 44. Each chain 49, is, as shown, provided with three bar lifting heads 52, which, at their upper portions, are pivoted at 54 to certain of the chain links, so that they are gravity-held in vertical depending positions throughout the movements of the said chains 49. On their inner faces, the lifting heads 52 are formed with buckets or recesses that receive and properly hold the ends of the endless bars 48 of the movable mold bars 13. A more exact relation of these parts will more fully appear in the description of the operation.

Figure 2:
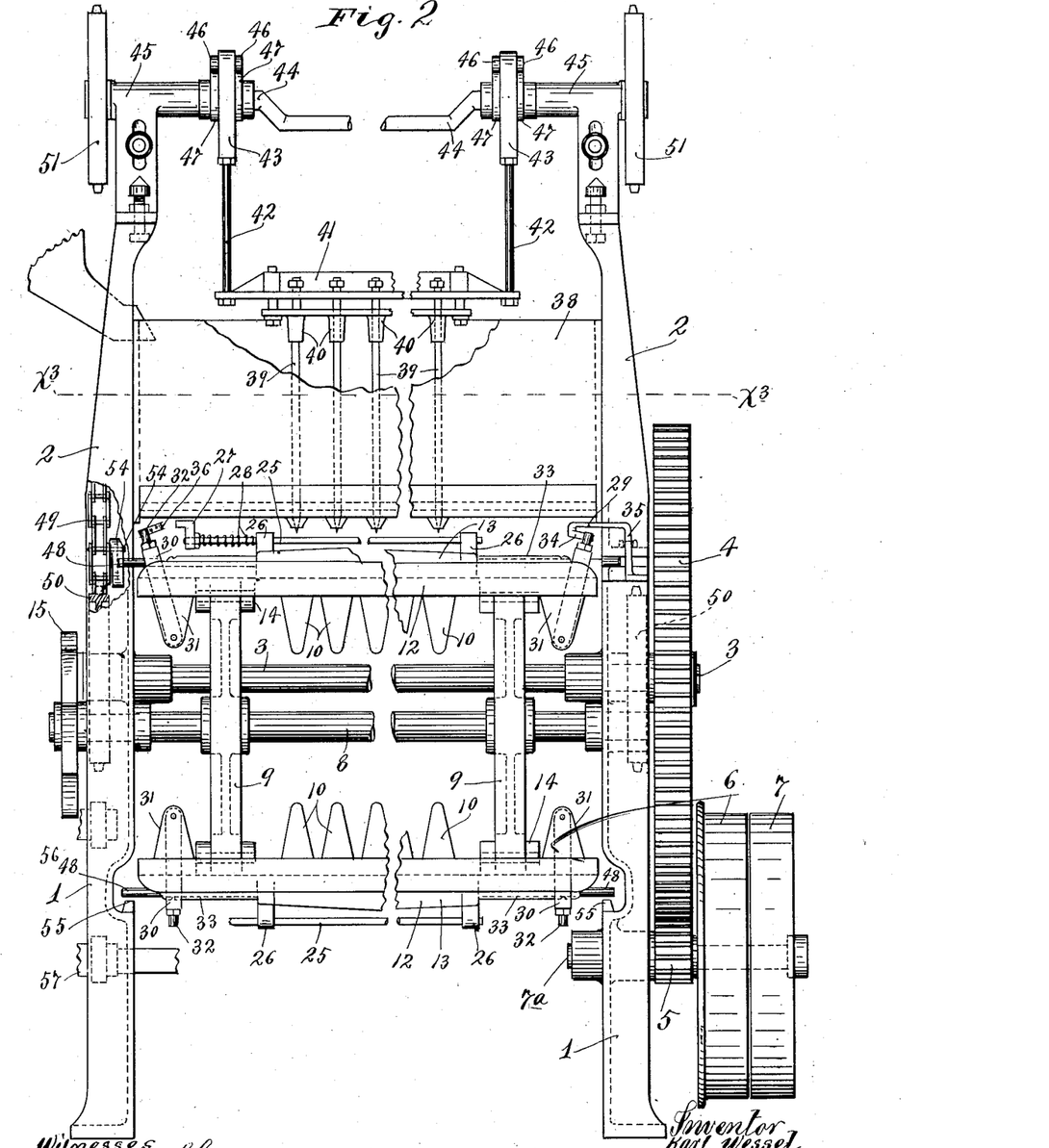
Fig. 2 is a front elevation of the machine, some parts thereof being broken away.

The frame plates 1 are provided with horizontal channels at the lower portions of which (see Fig. 2) are guide flanges 55 on which the ends of the handle bars 48 may rest. The timing and relation of the parts above described will more fully appear in the description of the operation.

Figure 1:
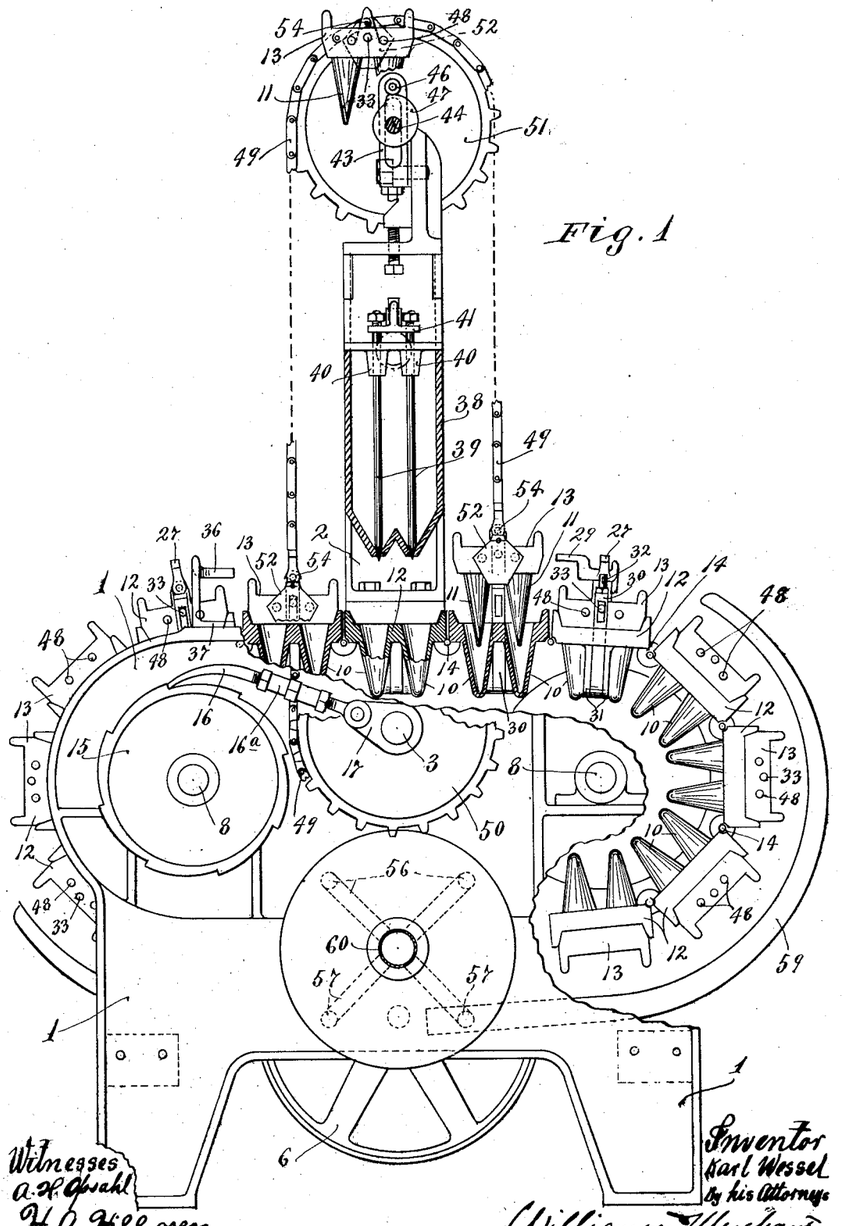
Figure 1 is a view chiefly in left side elevation, but with some parts sectioned and with some parts broken away, showing the improved machine.
Figure 5:
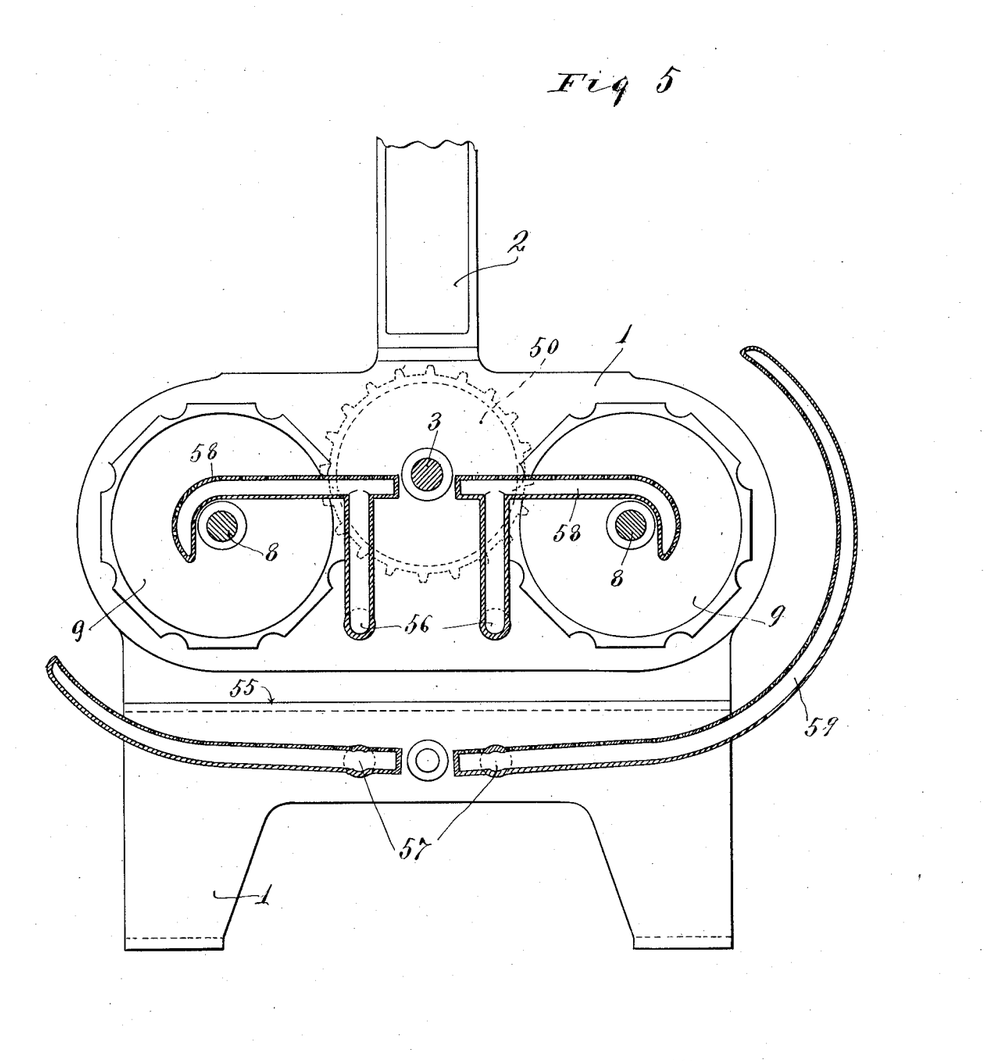
Fig. 5 is a view partly in side elevation and partly in vertical section taken longitudinally of the machine, approximately at the transverse center thereof, and illustrating, particularly, the form of the burners or twyers of the baking device, some parts being broken away.

Figs. 1 and 5 show a form of baking device which I preferably employ, and of the parts of which, the numeral 56 indicates an upper pair of gas supplying pipes, 57 indicates a lower pair of gas supply pipes. The gas supply pipes 56 terminate in a perforated twyer, or nozzles 58 that are adapted to direct the flame into the downturned receiving molds 10 which are on the upper bars 12. The lower pipes 57 are provided with perforated twyer or nozzle pipes 59 that are adapted to apply the flames directly to the mold bars 13 that are at the lower and upturned moving sections of the endless traveling chain made up of the mold bars 12. The gas pipes 56 and 57, as shown, all receive from a common gas supply pipe 60, indicated in part in Fig. 1.

Figures 12, 13:
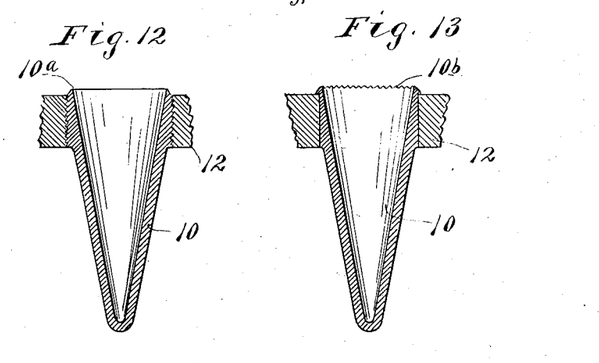
Figs. 12 and 13 are details in section showing the construction of the receiving molds.

The receiving molds 10, in some instances, may be cast integral with the bars 12, but they are preferably formed separately therefrom and connected therewith by threaded engagement, as indicated in Fig. 12, or by an opposite end portion, as indicated in Fig. 13. The receiving molds, however, are terminated in short annular edges 10$^a$, as best shown in Fig. 12, or by a serrated sharp edge 10$^b$, indicated in Fig. 13. These sharp edges serve to nearly, or quite, cut off the baked cones from the sheet, or flange of dough formed by overflow of the dough from the receiving molds when the cores 11 are inserted into the same.

*Operation.*

The operation of the machine is substantially as follows:

When the driving shaft 3 is continuously driven, by throwing the belt on the pulley 6, intermittent, or step by step movements will be imparted to the endless chain of mold-equipped bars 12. At the termination of each such intermittent movement, one of the mold bars 12 will be positioned with its receiving molds 10, directly below the corresponding dough discharge passages in the bottom of the hopper 38. While the mold bars thus remain stationary in this position just indicated, the plunger valves 39 will be raised and permit the proper amount of dough to be discharged from the hopper 38 into the underlying receiving molds 10. The dough discharge passage and hopper will be again closed before the next movement is imparted to the mold bars.

In the idle and normal position just indicated, and best illustrated in Fig. 1, one of the mold bars 13 stands in a position to be picked up from the mold bar 12 with which it has been coöperatively positioned, and another mold bar 12 stands in position to be picked up by the transferring device, and another mold bar 12 stands in position, just ahead of the filling point, to have a mold bar 13 delivered thereto by the said transferring device. More specifically stated, the transferring chains 49 are moved while the endless series of mold bars 12 remain stationary, and the one pair of gravity arighted carrying heads 52, catch the ends of the lifting bars 48, just at the rear of the filling point, and carry the mold bar 13, which is just at the rear of the filling point, first into an elevated position, and then forward of the filling point, and then downward and deposit the said mold bar 13 in coöperative relation in respect to the mold bar 12 which is just in front of the filling point. Two movements of the series of mold bars 12 are required, in the arrangement shown, to carry a lifted mold bar 13 from engagement with the one bar 12 into engagement with forward bar 12, and one mold bar 13 will always be in an uplifted position. By thus lifting the mold bars 13 and returning the same in coöperative relation, in respect to another mold bar 12, the mold bar 12 at the so-called filling or discharge point, is uncovered, while the dough in the proper quantity is supplied to the receiving molds 10 thereof.

After the dough is deposited in the molds of the bars 12, and the bars 12 and 13 are thereafter brought into coöperative relation, they are moved, step by step, nearly to the filling point and throughout the travel, they are subjected to the heat from the twyers, or nozzle pipes 58 and 59.

The fixed cam 29 operates on the head 27 of the rod 24 after the baking has been completed and just before the mold bars reach the position where they are to be separated by the transferring device. When the head 27, of the rod 24, is engaged with the said fixed cam 29, the said rod is moved endwise, toward the right, in respect to Fig. 7, and the first effect of this is to cause slight rotation of the mold cores 11, as already described, and the second effect is to slightly raise, or withdraw the said cores from the baking cones. Thus, as before stated, the cores are loosened and removed from the baked cones by a spiral receding movement. This spiral receding movement is important because it primarily loosens the cores by a twisting movement and immediately recedes from the baked brittle cones, so that the latter will not be cracked or broken if there is a slight irregularity in the cores. This, as is evident, loosens the cores from the baked cones so that the latter will not adhere thereto. At about the same time, that the head 27 is engaged with the fixed cam 29, as above described, the fixed cams 34, on both sides, simultaneously engage the stems 32 of the lock yokes 30, and positively force the same outward and thereby release the same from engagement with the projecting bars 33 of the mold bar 13, which is next to be lifted by the transferring device.

After the mold bar 13 has been again deposited in coöperative relation, in respect to the mold bar 12, which is in front of the so-called filling point, the next following movement of the endless series of bars 12, forces the stems 32, of the lock yokes 30, into engagement with the fixed cams 36, on both sides of the machine, and these cams simultaneously force the lock yokes 30 back into locking engagement with the end bars 33 of the said core bar 13. In this way, it will be seen that the two classes of core bars are automatically interlocked, automatically again re-assembled in coöperative relation and then automatically locked together so that they are ready for their journey past the baking devices. In fact, this machine, as preferably constructed, is automatic in all of its actions requiring only that the baked cones be removed from the molds 10 of the bar 12, which is just in front of the filling point, and from which the cores 11 have been raised.

This improved machine is especially intended as a pastry machine, but is capable of more general use, and it will, of course, be understood that the coöperating molds which form the various articles which may be made thereby, may be given various different forms, depending on the form of the article which it is desired to make.

What I claim is:

1. A mold bar provided with a mold terminating in a sharp serrated edge projecting beyond the face of said bar, as and for the purposes set forth.

2. The combination with a mold bar, of mold sections movably seated therein, and provided with caps having flaring transverse pin seats with their contracted ends eccentric to the axis of said mold sections, a tie bar having pins working in the pin seats of the said heads, substantially as and for the purposes set forth.

3. The combination with a mold bar, of mold sections movably seated therein, and provided with caps having flaring transverse pin seats with their contracted ends eccentric to the axis of said mold sections, a tie bar having pins working in the pin seats of the said heads, and means for imparting complex endwise and receding movement to said tie bar, whereby said mold sections will be caused to recede in said tie bars with a spiral movement.

4. In a machine of the kind described, a mold bar, a plurality of mold sections associated therewith, and means to impart spiral receding movements to said mold sections, said means comprising an element shiftable longitudinally of said mold bar, connections between said element and said mold sections whereby a combined longitudinal and lifting movement of the element produces a combined rotary and lifting movement of each of said mold sections, and means to shift said element longitudinally and simultaneously lift the same.

In testimony whereof I affix my signature in presence of two witnesses.

KARL WESSEL.

Witnesses:
F. D. MERCHANT,
HARRY D. KILGORE.